United States Patent
Westgarth et al.

(10) Patent No.: US 10,822,832 B2
(45) Date of Patent: Nov. 3, 2020

(54) MOTOR VEHICLE DOOR ANTI-RATTLE MECHANISM

(71) Applicant: FORD GLOBAL TECHNOLOGIES, LLC, Dearborn, MI (US)

(72) Inventors: Brian Westgarth, Billericay (GB); Ian Patterson, Billericay (GB); Jack Whitehurst, Leigh on Sea (GB); Rob Swann, Rayleigh (GB)

(73) Assignee: Ford Global Technologies, LLC, Dearborn, MI (US)

(*) Notice: Subject to any disclaimer, the term of this patent is extended or adjusted under 35 U.S.C. 154(b) by 78 days.

(21) Appl. No.: 16/245,562

(22) Filed: Jan. 11, 2019

(65) Prior Publication Data
US 2019/0218820 A1 Jul. 18, 2019

(30) Foreign Application Priority Data
Jan. 18, 2018 (GB) .................. 1800809.4

(51) Int. Cl.
| | |
|---|---|
| *E05B 15/00* | (2006.01) |
| *B60J 5/06* | (2006.01) |
| *E05F 5/06* | (2006.01) |
| *E05F 15/659* | (2015.01) |
| *E05B 65/08* | (2006.01) |
| *E05F 7/04* | (2006.01) |

(52) U.S. Cl.
CPC ............ *E05B 15/0006* (2013.01); *B60J 5/06* (2013.01); *E05B 65/08* (2013.01); *E05F 5/06* (2013.01); *E05F 15/659* (2015.01); *E05F 7/04* (2013.01); *E05Y 2201/222* (2013.01); *E05Y 2201/246* (2013.01); *E05Y 2900/531* (2013.01)

(58) Field of Classification Search
CPC .. E05F 15/659; E05F 5/06; E05F 7/04; E05B 15/0006; E05B 65/08; B60J 5/06; E05Y 2201/222; E05Y 2201/246; E05Y 2900/531
USPC ........................................................ 296/155
See application file for complete search history.

(56) References Cited

U.S. PATENT DOCUMENTS

| | | | |
|---|---|---|---|
| 6,206,455 B1 * | 3/2001 | Faubert ...................... | B60J 5/06 16/86 B |
| 2004/0231099 A1 | 11/2004 | Li | |
| 2005/0198904 A1 | 9/2005 | Browne et al. | |

(Continued)

FOREIGN PATENT DOCUMENTS

| | | |
|---|---|---|
| DE | 202008008431 U1 | 11/2009 |
| GB | 0199686 A | 6/1923 |
| GB | 1362084 A | 7/1974 |

OTHER PUBLICATIONS

English Machine Translation of DE202008008431U1 dated Nov. 5, 2009.

*Primary Examiner* — Joseph D. Pape
*Assistant Examiner* — Dana D Ivey
(74) *Attorney, Agent, or Firm* — David Copiellie; King & Schickli, PLLC (57) ABSTRACT

A motor vehicle door anti-rattle mechanism includes male and female parts. The male part is fastened to a door of a motor vehicle and the female part is fastened to a door pillar of the motor vehicle. The male part includes an expandable member that is selectively engageable with a recess in the female part in order to inhibit relative movement between the male and female parts and, hence, rattling of the door.

14 Claims, 5 Drawing Sheets

(56) References Cited

U.S. PATENT DOCUMENTS

2006/0137252 A1 6/2006 Kriese et al.
2014/0306467 A1* 10/2014 Wollacott ............ E05B 15/0006
　　　　　　　　　　　　　　　　　　　　　292/341.15
2016/0305174 A1* 10/2016 Swann .................... E05F 5/022
2017/0130504 A1 5/2017 Westgarth et al.

* cited by examiner

| Actuator 40 State | Door 5 State | Door Release 70 State |
|---|---|---|
| Not Actuated | Open | Actuated |
| Not Actuated | Open | Not Actuated |
| Not Actuated | Closed | Actuated |
| Actuated | Closed | Not Actuated |

MOTOR VEHICLE DOOR ANTI-RATTLE MECHANISM

TECHNICAL FIELD

This document relates to motor vehicle doors and in particular to preventing rattling of such a door when a vehicle of which the door forms a part is traversing uneven terrain.

BACKGROUND

Motor vehicle door stability over rough surfaces is difficult to achieve without compromising closing efforts. Excessive door movement will result in squeak and rattle issues and increased wear of door hardware such as wedges, latches and strikers.

In extreme cases, movement of the door can be so great that paint damage will occur between the door and the surrounding body structure.

Conventional door setting of passive wedges to obtain the best compromise between squeak rattle and door closing forces is achieved through iterative setting and resetting and achieving good closing efforts with good squeak and rattle performance requires significant tuning which is a time consuming and hence expensive process.

A significant problem with known passive door wedges used to prevent rattling is that they rely on an interference fit which cannot be so great as to stop door closing and this often results in them being less effective at stopping unwanted door movement.

SUMMARY

It is an object of this document to provide an anti-rattle mechanism for a motor vehicle door than can be used to replace a conventional door wedge but does not require lengthy setting or tuning.

According to a first aspect, there is provided a motor vehicle door anti-rattle mechanism comprising: (a) a male part comprising an actuation member having an actuator head at a first end of an actuator rod and a body slidingly supporting the actuation rod of the actuation member for fastening in use to one of a door and a door pillar of a motor vehicle of which the anti-rattle mechanism forms a part; (b) a female part located on the other of the door and the door pillar of the motor vehicle of which the anti-rattle mechanism forms a part; and (c) an expandable member made from an elastically compressible material interposed between an end face of the body and a face of the actuator head. When the male part is in a non-actuated state it is engageable with clearance in a recess in the female part. When the male part is engaged in the recess and is actuated to inhibit relative movement between the male and female parts the expandable member has a surface which is brought into contact with the recess in the female part by axial compression of the expandable member.

The axial compression of the expandable member may cause the expandable member to expand outwardly so as to bring an outer surface of the expandable member into contact with the recess in the female part.

The outward expansion may be a radial outward expansion.

The recess may be a cylindrical recess of constant diameter.

An unrestrained diameter of the expandable member if axially compressed by a force equal to the force used when the male part is actuated may be larger than the diameter of the cylindrical recess thereby producing an interference force between the male part and the female part when the male part is in engagement with the recess in the female part and the male part is in an actuated state.

Movement of the actuator head towards the body may cause the expandable member to be axially compressed.

The actuator rod may be connected at a second end to an actuator mechanism used to move the actuator head towards the body to actuate the male part thereby axially compressing the expandable member.

According to a second aspect, there is provided a motor vehicle having: (a) a door moveably mounted on a body structure of the motor vehicle and (b) a door pillar to which the door is secured when in a closed position by a latching mechanism and a motor vehicle door anti-rattle mechanism. That motor vehicle door anti-rattle mechanism is constructed in accordance with said first aspect wherein the male part is fastened to one of the door and the door pillar and the female part is located on the other of the door and the door pillar.

The male part may be fastened to the door and the female part may be located on the door pillar.

The door may be a sliding door.

According to a third aspect, there is provided a motor vehicle door anti-rattle system for a motor vehicle having: (a) a door moveably mounted on a body structure of the motor vehicle and (b) a door pillar to which the door is secured when in a closed position by a latching mechanism. The system includes a motor vehicle door anti-rattle mechanism constructed in accordance with said first aspect. The system further comprises an electronic controller and an electronically controllable actuator operatively connected to the electronic controller to selectively actuate the male part of the door anti-rattle mechanism. Further, the electronic controller is operable in response to inputs indicative of whether the door is fully closed and whether there is request to open the door, to only actuate the male part when the inputs indicate that the door is fully closed and there is no current request to open the door.

The electronic controller may be further operable to prevent the actuation of the male part when the motor vehicle is stationary.

The male part may be fastened to the door and the female part may be located on the door pillar.

The door may be a sliding door.

BRIEF DESCRIPTION OF THE DRAWING FIGURES

The motor vehicle door anti-rattle mechanism and the motor vehicle will now be described by way of example with reference to the accompanying drawing of which.

DETAILED DESCRIPTION

Figure 1:
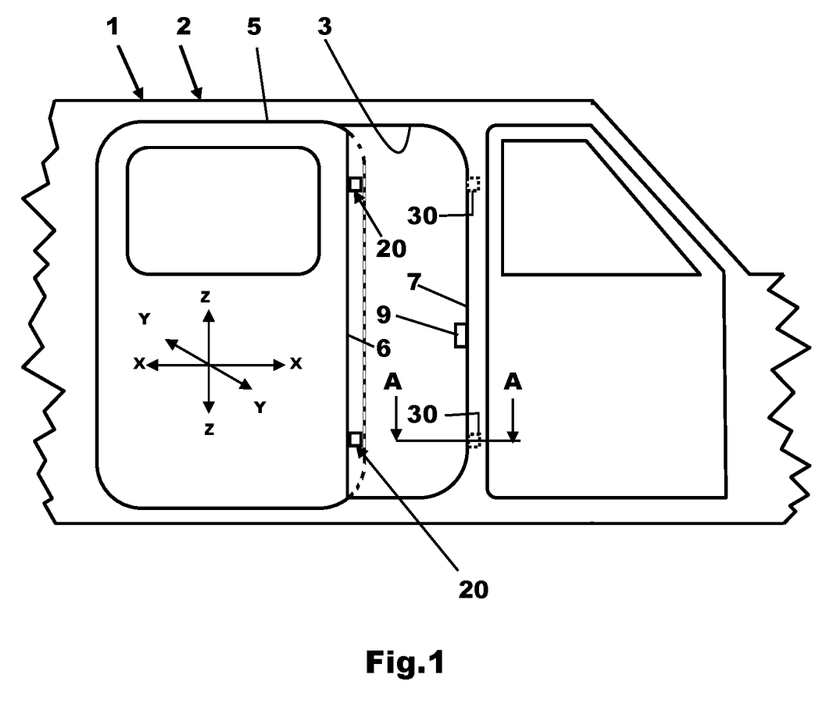
FIG. 1 is a partial side view of a motor vehicle having a sliding side door showing the sliding door in a partially open position.
Figure 2:
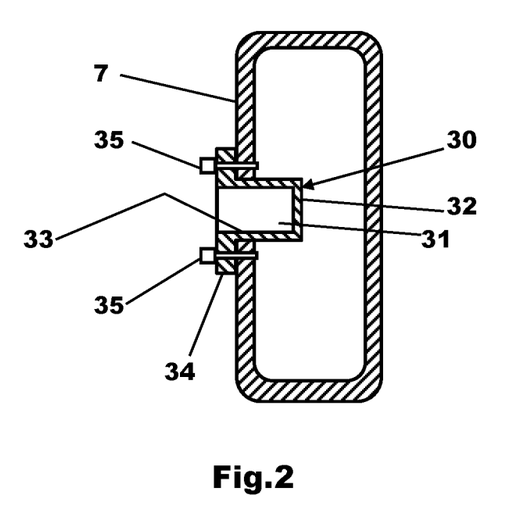
FIG. 2 is a cross-section along the line A-A on FIG. 1 showing a female part of an anti-rattle mechanism.

With particular reference to FIGS. 1 and 2 there is shown a motor vehicle 1 having a body structure 2 defining a side door aperture 3 a front end of which is formed by a door pillar 7. A sliding door 5 is slidingly mounted on the motor vehicle 1 to selectively reveal or conceal the door aperture 3 as is well known in the art. The sliding door 5 is secured to the door pillar 7 when in a closed position by a latching mechanism 9 as is well known in the art. The latching mechanism 9 is selectively releasable in response to a request by a user of the motor vehicle 1 to open the sliding door 5. The request may be a manual action such as pulling on a door handle (not shown) or an electrically assisted action using a button or switch to provide the request to a powered door opening mechanism used to open the sliding door 5.

The primary motion of the sliding door 5 during opening and closing is a sliding motion in an X-X direction of the motor vehicle that corresponds to a longitudinal direction of the motor vehicle 1.

However, it will be appreciated that the sliding door 5 can also move due to tolerances and clearances in the mechanism used to slidingly mount the sliding door 5 on the motor vehicle 1 by very small amounts in the order of a few millimetres in a vertical or Z-Z direction of the motor vehicle 1 and in a transverse or Y-Y direction of the motor vehicle 1.

The sliding door 5 has a leading or front end 6 from which projects, in the case of this example, two male parts 20 of a pair of anti-rattle mechanism 10. One male part 20 located near a top end of the sliding door 5 and one male part 20 located near a bottom end of the sliding door 5.

It will be appreciated that each of the male parts 20 is fastened to part of the structure forming the sliding door 5. It will be further appreciated that there may be less or more than two male parts 20 depending upon the size and weight of the respective sliding door. It will be further appreciated that there is an outer part of the sliding door 5 that when the sliding door 5 is in a closed position overlies the door pillar 7 this outer part is shown in dashed outline in FIG. 1.

Each anti-rattle mechanism 10 further comprises a female part 30 shown as a dotted outline on FIG. 1 and in cross-section in FIG. 2. In the case of this example each female part 30 is a separate component that is fastened to the door pillar 7 in a position such that a central axis of each female part 30 is substantially aligned with a longitudinal central axis of a respective male part 20 when the sliding door 5 is in a closed position.

In the case of this preferred embodiment each of the female parts 30 is fastened to the door pillar 7 via a pair of threaded fixings 35. However, it will be appreciated that other securing means such as rivets or welding could be used. It will also be appreciated that in other embodiments (not shown) each of the female parts 30 could be formed as an integral part of the door pillar 7.

Each of the female parts 30 comprises a body portion 32 defining in the case of this example a cylindrical recess 31 and an end flange 34 used for fastening the female body part 30 to the door pillar 7. The cylindrical recess 31 is defined by a cylindrical wall 33 of constant diameter along its length.

It will however be appreciated that the male part 20 and the recess 31 could be of another uniform shape such as a rectangle (See FIG. 7), a square or a polygon and that the mechanism is not limited to the use of a cylindrical male part and cylindrical recess although such a shape is particularly easy to manufacture.

Figure 3A:
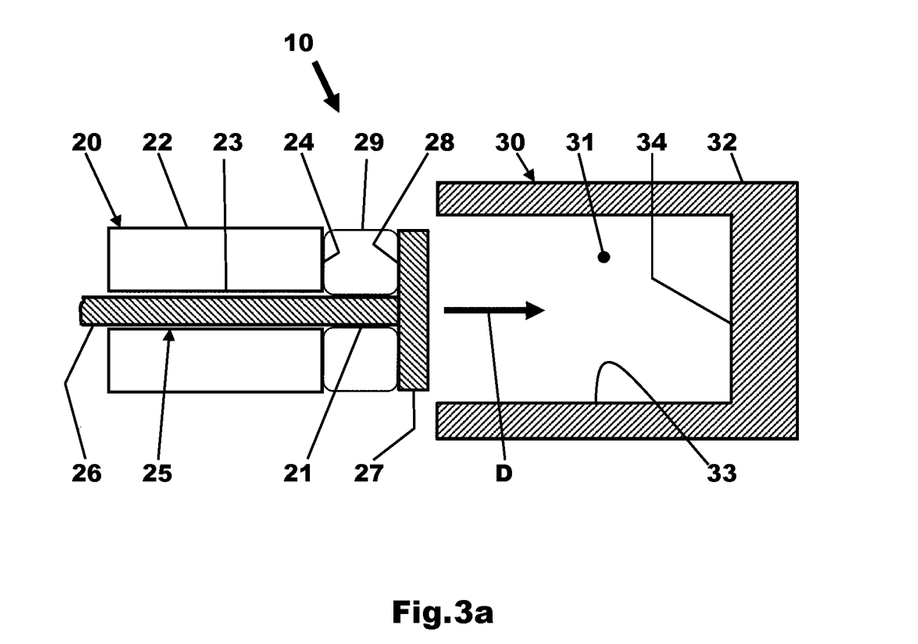
FIG. 3a is diagrammatic cross-sectioned representation of an anti-rattle mechanism showing the respective positions of male and female parts of the anti-rattle mechanism as a sliding door to which the male part of the anti-rattle mechanism is fastened approaches a door closed position.
Figure 3B:
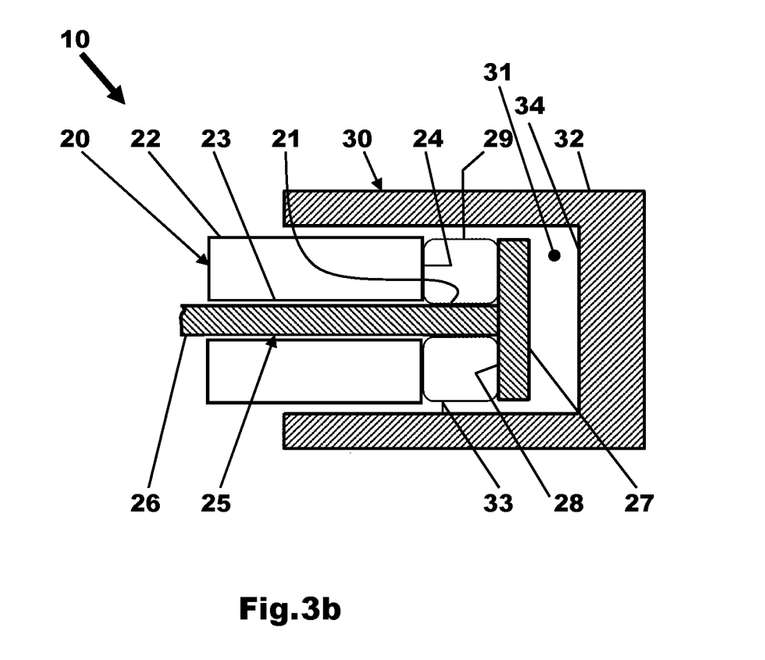
FIG. 3b is diagrammatic cross-sectioned representation of the anti-rattle mechanism shown in FIG. 3a showing the anti-rattle mechanism when the sliding door to which the male part of the sliding door mechanism is fastened is in a door closed position and the anti-rattle mechanism is in a non-actuated state.
Figure 3C:
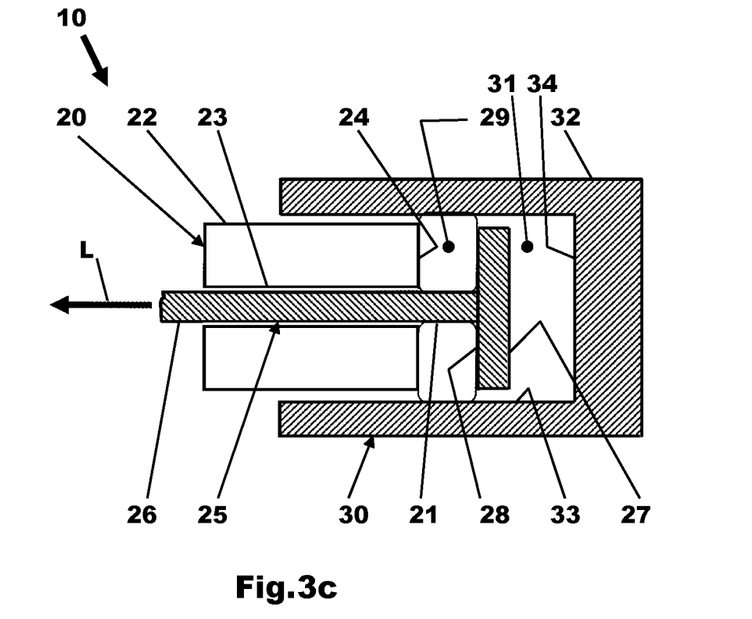
FIG. 3c is diagrammatic cross-sectioned representation of the anti-rattle mechanism shown in FIGS. 3a and 3b showing the anti-rattle mechanism when the sliding door is in a door closed position and the anti-rattle mechanism is in an actuated state.

With particular reference to FIGS. 3a to 3c a single anti-rattle mechanism 10 is shown in more detail albeit it in a diagrammatic manner.

With reference to FIG. 3a the male part 20 of the anti-rattle mechanism 10 comprises a body 22 for fastening the male part 20 to the sliding door 5, an actuator member 25 slidingly supported by the body 22 and a expandable interference member 29. The expandable interference member 29 is made from an elastically compressible material that will return to a natural relaxed size when not being axially compressed that is smaller than the size it adopts when axially compressed.

In the case of this example, the expandable interference member 29 is in the form of a compressible tubular elastomeric or rubber doughnut having a cylindrical outer surface when in an uncompressed state that when compressed in a longitudinal direction expands radially so as to make contact with the cylindrical wall 33 forming the recess 31 in the female part 30.

Figure 6:
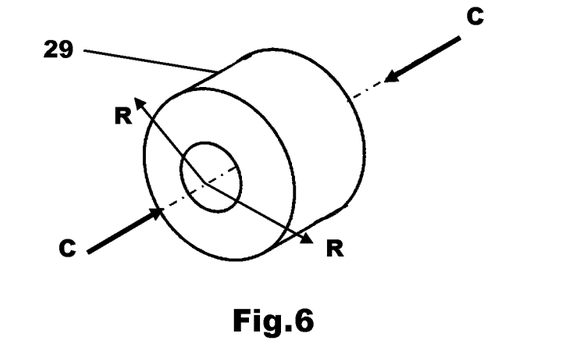
FIG. 6 is a pictorial view on an enlarged scale of an expandable interference member showing axial and radial directions.

FIG. 6 shows the expandable interference member 29 on an enlarged scale with the arrows "C" showing what is meant by axial compression and the arrows "R" showing what is meant by radial expansion.

The term "interference" is used with respect to the member 29 because, when the member 29 is compressed, an outer diameter of the expandable interference member 29, if unrestrained by the cylindrical wall 33, would be greater than the diameter of the cylindrical recess 31 as defined by the cylindrical wall 33.

However, it will be appreciated that the expandable interference member 29 could alternatively comprise of a number of separate blocks that when axially compressed expand in a direction normal to the applied compressive force so as to make contact with the female part.

The actuator member 25 comprises a cylindrical actuator rod 26 and a disc shaped actuator head 27 which, in the case of this example, is a separate component fastened to a first end of the actuator rod 26 but could be made as an integral part in combination with the actuator rod 26.

Figure 4:
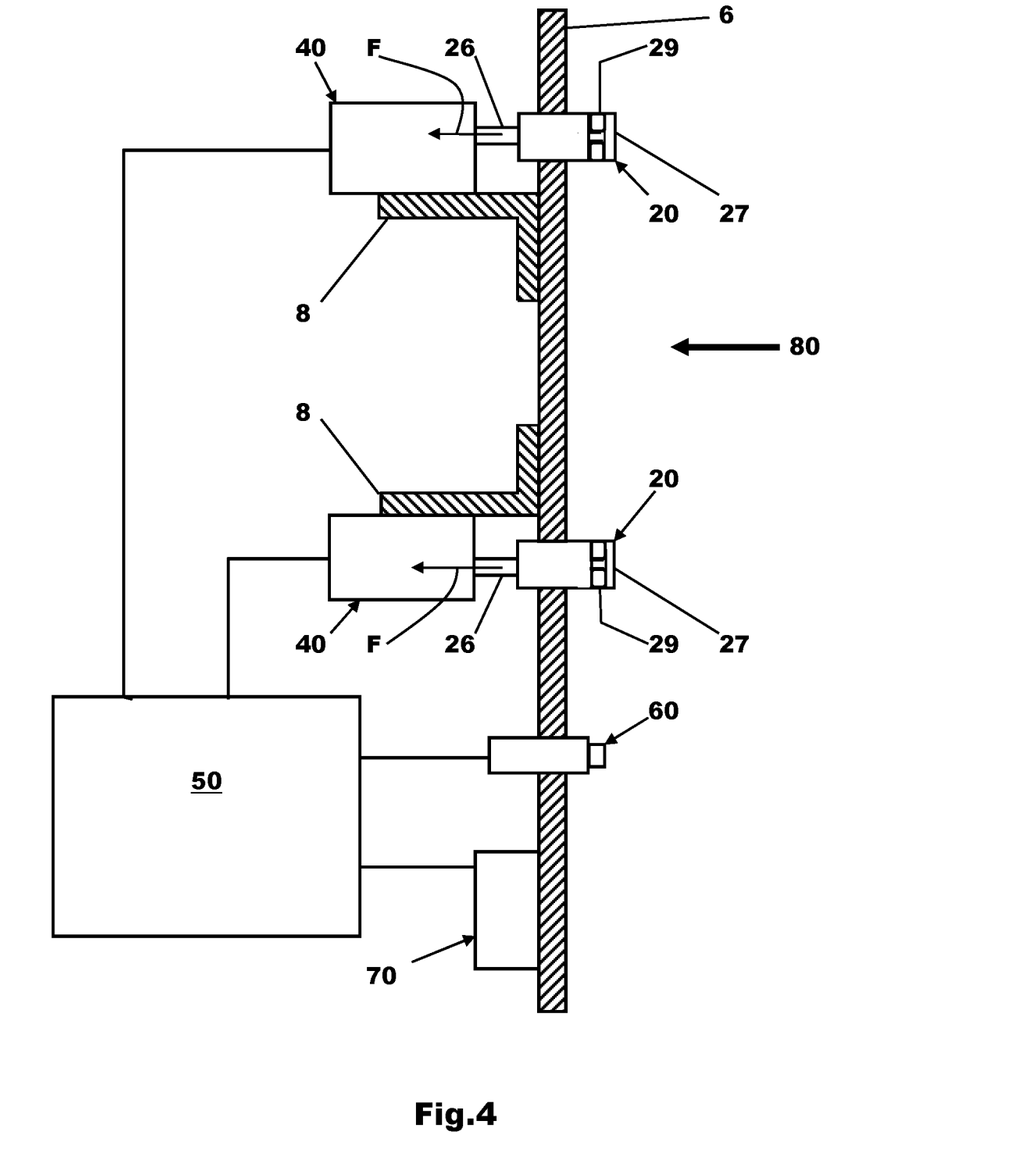
FIG. 4 is a schematic diagram of a door system including two anti-rattle mechanisms mounted on a sliding door.

A second distal end (not shown) of the actuator rod 26 is arranged to be connected to an actuation mechanism. The actuation mechanism can be a manually operated mechanism or, as shown in FIG. 4, be an electrically operated actuation mechanism.

The actuator rod 26 is slidingly supported in a cylindrical bore 23 formed in the body 22.

The body 22 has an annular end face 24 from which projects the actuator rod 26. The actuator head 27 has an annular face 28 facing the annular end face 24 of the body 22. The expandable interference member 29 has a central bore 21 through which the actuator rod 26 extends for connection to the actuator head 27. The expandable interference member 29 is therefore interposed between the annular end face 24 of the body 22 and the annular face 28 of the actuator head 27.

In FIG. 3a the situation is shown as the sliding door 5 approaches the door pillar 7. In this position the male part 20 of the anti-rattle mechanism 10 is moving in the direction of arrow "D" on FIG. 3a but is not currently engaged with the female part 30 of the anti-rattle mechanism 10. The expandable interference member 29 is in a free state, that is to say, it is not being compressed.

In FIG. 3b the situation is shown when the sliding door 5 reaches a fully closed position. In this position the male part 20 of the anti-rattle mechanism 10 is no longer moving but is now fully engaged with the cylindrical recess 31 defined by the body portion 32 of the female part 30 of the anti-rattle mechanism 10. Note that the depth of the cylindrical recess 31 is sufficient that when the sliding door 5 is fully closed there is a clearance between the actuator head 27 and an end wall 34 of the cylindrical recess 31. It will be appreciated that in other embodiments, the female part 30 could have a tubular body so that there is no end wall for the actuator head 27 to contact.

In this fully engaged but un-actuated state the expandable interference member 29 remains in a free state, that is to say, it is not being compressed.

In FIG. 3c the situation is shown when the sliding door 5 reaches a fully closed position and the male part 20 is in actuated state. The male part 20 of the anti-rattle mechanism 10 is fully engaged with the cylindrical recess 31 defined by the body portion 32 of the female part 30 of the anti-rattle mechanism 10 and the actuator member 25 has been moved in the direction of arrow "L" on FIG. 3c into an actuated position by the action of an actuation mechanism not shown in FIG. 3c.

In the actuated position of the actuator member 25 the expandable interference member 29 has been axially compressed between the annular face 28 of the actuator head 27 and the annular end face 24 of the body 22 due to the application of a force applied by an actuation mechanism to which the second end of actuator rod 26 is connected. The application of this force will cause longitudinal movement of the actuator rod 26 in the direction of arrow "L" on FIG. 3c thereby axially compressing the expandable interference member 29.

The axial compression of the expandable interference member 29 by the action of the actuator head 27 moving towards the body 22 causes it to expand radially thereby engaging the cylindrical recess 31 so as to produce an interference fit between the male and female parts 20 and 30 of the anti-rattle mechanism 10. In effect the expansion of the expandable interference member 29 causes the male part 20 to be clamped to the female part of the anti-rattle mechanism thereby preventing the sliding door 5 from movement in three directions namely vertically (Z-Z), transversely (Y-Y) and longitudinally (X-X) with respect to the motor vehicle 1.

This arrangement has a number of advantageous effects firstly, it prevents rattling of the sliding door 5, secondly it prevents fore-aft shuffle of the sliding door 5 due to tolerances in the latch mechanism 9 used to hold the sliding door 5 closed and thirdly, because the interference between the male and female parts 20 and 30 only occurs when the sliding door is fully closed, it will not adversely affect the opening or closing of the sliding door 5.

Preferably the recess in the female part 30 is of constant width along its length as this provides the best resistance to movement in the longitudinal direction of the motor vehicle 1. It will be appreciated that if the recess has a converging tapering width any movement of the sliding door 5 away from the pillar 7 would tend to reduce the gripping power of the male part 20, particularly, in the longitudinal direction X-X of the motor vehicle 1.

In addition, because the interference only occurs when the sliding door 5 is fully closed a significant clearance can be provided between the male and female parts 20 and 30 during opening and closing of the sliding door 5. Therefore a lengthy setting process is not required and larger relative tolerances can be used.

Figure 5:
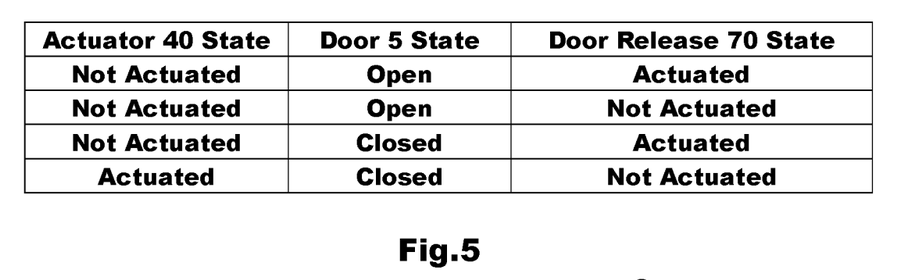
FIG. 5 is a table indicating various factors affecting whether or not the anti-rattle mechanisms should be placed in an actuated state.

With particular reference to FIGS. 4 and 5 there is shown schematically in FIG. 4 one embodiment of a motor vehicle door anti-rattle system 80.

In the case of the example shown the system 80 includes two anti-rattle mechanisms such as the mechanisms 10 previously described of which only the male parts are shown on FIG. 4. The male parts 20 are in the case of this example shown fastened to the front edge 6 of the sliding door 5 shown in FIG. 1.

However, it will be appreciated that the invention is not limited to the use of two male parts, the same locations for male parts or the same type of door.

Each of the male parts 20 is operatively connected to an electronically controllable actuator 40. Each electronically controllable actuator 40 is attached to the door 5 by means of a respective bracket 8.

The electronically controllable actuators 40 can be of any suitable type such as, for example and without limitation, electrical, electro-hydraulic or electro-pneumatic.

The electronically controllable actuators 40 are operatively connected to an electronic controller 50 is arranged to control the operation of the two electronically controllable actuators 40.

The system 80 further comprises a door sensor 60 to sense when the sliding door 5 is fully closed and a door latch sensor 70 to detect when request to open the sliding door 5 is present. The request can be when a door handle has been operated by an occupant of the motor vehicle 1 to open the sliding door 5 in the case of a manually operated door or when a door open command is present in the case of a power operated sliding door mechanism.

In the actuated state each of the electronically controllable actuators 40 applies a longitudinal force to the respective actuator rod 26 to which it is connected in the direction of the arrow "F" on FIG. 4 which causes the associated expandable interference member 29 to be axially compressed thereby causing it to expand radially into contact with the recess 31 in the female part 30 with which it is engaged. When an electronically controllable actuator 40 is not actuated the respective expandable interference member 29 will return to its natural relaxed diameter so that a clearance is produced between the male and female parts 20 and 30.

As shown in FIG. 5, it is only when the input from the door sensor 60 indicates that the door 5 is fully closed and the input from the latch sensor 70 indicates that there is no current request to open the sliding door 5 that the electronic controller 50 will cause the electronically controllable actuators 40 to be actuated to produce interfering engagement between the male and female parts 20 and 30 of the anti-rattle mechanism 10 to take place.

If the sliding door 5 is in a fully closed position and the door latch sensor 70 senses a request to open the sliding door 5 by an occupant of the motor vehicle 1, the electronic controller 50 will automatically put the two electronically controllable actuators 40 into a not-actuated state so as to allow the sliding door 5 to be opened freely.

Similarly, the two electronically controllable actuators 40 will remain in a not-actuated state whenever the input from the door sensor 60 indicates that the sliding door 5 is not fully closed.

In addition to the inputs shown in FIG. 4, the electronic controller 50 may additionally receive an input from a vehicle speed sensor (not shown) and be arranged to always put the two electronically controllable actuator 40 in the not-actuated state whenever the motor vehicle 1 is not moving.

It will be appreciated that the two male parts 20 could be actuated by a manual actuation system in other embodiments and that the invention is not limited to use with an electronically controlled actuation system.

Although the invention has been described with reference to an embodiment in which the door is a sliding door, the male part is fastened to the door and the female part is fastened to or formed as part of the door pillar it is not limited to such an arrangement. For example, the female part could be fastened to or be formed as part of the door and the male part could be fastened to the door pillar.

Furthermore, the door need not be a sliding door and the invention is equally applicable to other types of motor vehicle closure such as, for example and without limitation, a side hinged door, a side hinged tailgate and a top hinged tailgate.

Furthermore, although as described previously the male part enters the female part axially in a longitudinal direction of the male part, this need not be the case and the male part can enter the female part in a transverse direction.

Figure 7:
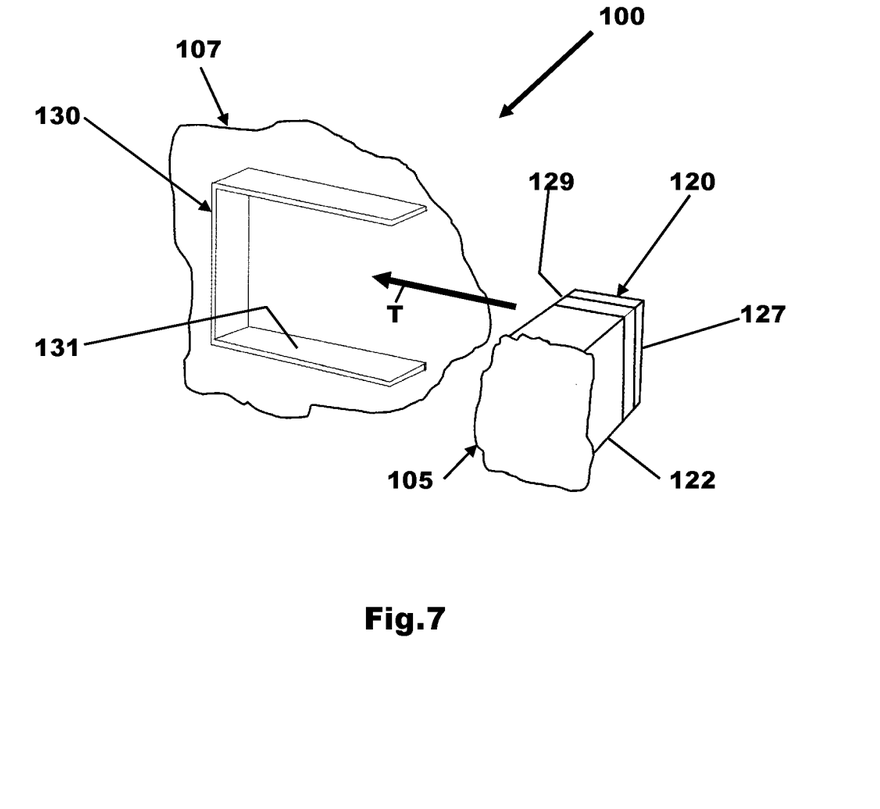
FIG. 7 is a pictorial view of a second embodiment of anti-rattle mechanism.

FIG. 7 shows such an arrangement in the form of a second embodiment of an anti-rattle mechanism 100 in which a rectangular male part 120 attached to a door 105 is shown moving in a transverse direction "T" into engagement with a rectangular recess 131 in a female part 130 attached to a door pillar 107. As before the male part 120 has an expandable interference member 129 positioned between a body 122 of the male part 120 and actuator head 127 of the male part 120. As with the previously described embodiment the expandable interference member 129 is expanded outwardly for engagement with the recess 131 when the actuator head 127 is moved towards the body 122.

It will be appreciated by those skilled in the art that although the mechanism and motor vehicle have been described by way of example with reference to one or more embodiments they are not limited to the disclosed embodiments and that alternative embodiments could be constructed without departing from the scope of the mechanism and motor vehicle as defined by the appended claims.

The invention claimed is:

1. A motor vehicle door anti-rattle mechanism, comprising:
    a male part including an actuation member having an actuator head at a first end of an actuator rod and a body slidingly supporting the actuator rod of the actuation member fastened to one of a door and a door pillar of a motor vehicle;
    a female part located on the other of the door and the door pillar; and
    an expandable member made from an elastically compressible material carried on the actuator rod and interposed between an end face of the body and a face of the actuator head, wherein when the male part, in a non-actuated state, is engageable in a recess in the female part and when the male part is engaged in the recess and is actuated to inhibit relative movement between the male and female parts the expandable member has a surface which is brought into contact with the recess in the female part by axial compression of the expandable member.

2. The motor vehicle door anti-rattle mechanism as claimed in claim 1, wherein the axial compression of the expandable member causes the expandable member to expand outwardly so as to bring an outer surface of the expandable member into contact with the recess in the female part.

3. The motor vehicle door anti-rattle mechanism as claimed in claim 2, wherein expansion of the expandable member is an expansion radially outward from the actuator rod.

4. The motor vehicle door anti-rattle mechanism as claimed in claim 3, wherein the recess is a cylindrical recess of constant diameter.

5. The motor vehicle door anti-rattle mechanism as claimed in claim 4, wherein an unrestrained diameter of the expandable member if axially compressed by a force equal to the force used when the male part is actuated is larger than the diameter of the cylindrical recess thereby producing an interference fit between the male part and the female part when the male part is in engagement with the recess in the female part and the male part is in an actuated state.

6. The motor vehicle door anti-rattle mechanism as claimed in claim 5, wherein movement of the actuator head towards the body causes the expandable member to be axially compressed.

7. The motor vehicle door anti-rattle mechanism as claimed in claim 6, wherein the actuator rod is connected at a second end to an actuator mechanism used to move the actuator head towards the body to actuate the male part thereby axially compressing the expandable member.

8. A motor vehicle, comprising:
    the motor vehicle door anti-rattle mechanism as claimed in claim 1;
    the door moveably mounted on a body structure of the motor vehicle; and
    the door pillar to which the door is secured when in a closed position by a latching mechanism.

9. The motor vehicle as claimed in claim 8 wherein the male part is fastened to the door and the female part is located on the door pillar.

10. The motor vehicle as claimed in claim 9 wherein the door is a sliding door.

11. A door anti-rattle system for a motor vehicle, comprising:
    the door moveably mounted on a body structure of the motor vehicle;
    the door pillar to which the door is secured when in a closed position by a latching mechanism; and
    the motor vehicle door anti-rattle mechanism as claimed in claim 1, wherein the system further comprises an electronic controller and an electronically controllable actuator operatively connected to the electronic controller to selectively actuate the male part of the door anti-rattle mechanism and the electronic controller is configured in response to inputs indicative of whether the door is fully closed and whether there is request to open the door, to only actuate the male part when the inputs indicate that the door is fully closed and there is no current request to open the door.

12. The door anti-rattle system as claimed in claim 11, wherein the electronic controller is further configured to prevent the actuation of the male part when the motor vehicle is stationary.

13. The door anti-rattle system as claimed in claim 12 wherein the male part is fastened to the door and the female part is located on the door pillar.

14. The door anti-rattle system as claimed in claim 13 wherein the door is a sliding door.

* * * * *